United States Patent [19]

Morishita et al.

[11] Patent Number: 4,715,243
[45] Date of Patent: Dec. 29, 1987

[54] PLANETARY REDUCTION GEAR HAVING A MOLDED RING GEAR

[75] Inventors: Akira Morishita; Kyoithi Okamoto, both of Himeji; Toshihiko Gotoh, Ako; Yukio Kako, Himeji; Takemi Arima, Kakogawa, all of Japan

[73] Assignee: Mitsubishi Denki Kabushiki Kaisha, Japan

[21] Appl. No.: 770,979

[22] Filed: Aug. 30, 1985

[30] Foreign Application Priority Data

Sep. 4, 1984 [JP] Japan .......................... 59-134690[U]

[51] Int. Cl.$^4$ ............................................. F16H 55/17
[52] U.S. Cl. ............................. 74/434; 74/DIG. 10; 264/328.12; 264/230; 428/66
[58] Field of Search ................ 74/434, DIG. 10, 801; 264/328.12, 328.18, DIG. 67, DIG. 71, 272.13, 230; 428/64, 65, 66; 403/370

[56] References Cited

U.S. PATENT DOCUMENTS 3,880,978  4/1975  Apostoleris et al. ............ 264/328.12
4,408,320 10/1983  Buzgo ................................... 428/66
4,472,164  9/1984  Pusch et al. .................. 74/DIG. 10
4,512,681  4/1985  Hayhurst et al. .................... 403/370

FOREIGN PATENT DOCUMENTS 2379736 10/1978  France .......................... 74/DIG. 10
2109471  6/1983  United Kingdom .

Primary Examiner—Randolph A. Reese
Assistant Examiner—Joseph A. Fischetti
Attorney, Agent, or Firm—Leydig, Voit & Mayer

[57] ABSTRACT

A planetary reduction gear has an internally-toothed ring gear which is made of a molded synthetic resin. The ring gear has a rim formed in its outer periphery in which is formed a plurality of seats comprising through seats and non-piercing holes, the seats being provided at equal intervals around the periphery of the rim. The non-piercing seats extend only part way through the thickness of the rim. The provision of seats over the entire periphery of the rim causes sink marks which develop at the time of molding of the ring gear to act uniformly and deformation of the ring gear is prevented.

4 Claims, 6 Drawing Figures

PLANETARY REDUCTION GEAR HAVING A MOLDED RING GEAR

BACKGROUND OF THE INVENTION

The present invention relates to a planetary reduction gear having a molded ring gear. More particularly but not exclusively, it relates to a planetary reduction gear having a molded ring gear for use in an internal deceleration-type starter for an automobile or other vehicle, the molded ring gear being improved in that it does not undergo deformation due to sink marks during molding.

An internal deceleration-type starter is a starter in which the starter motor and the reduction gear for the motor are a single unit contained within the same housing. Commonly, the reduction gear for the motor is a planetary gear having an internally-toothed ring gear made of a molded synthetic resin.

FIG. 1 illustrates a molded ring gear for a conventional starter of this type. The ring gear 1 is a single body formed by molding of a synthetic resin and comprises internal teeth 2, an outer rim 3 which surrounds the teeth 2, an inner flange 4 which supports a rotating shaft, and wall 5 which connects the outer rim 3 with the inner flange 4. In the outer periphery of the outer rim 3 are formed two semicircular projections 3a separated by 180 degrees and two semicircular through slots 3b separated from one another by 180 degrees and separated from the projections 3a by a central angle of 30 degrees. The projections 3a fit into grooves in a front frame of a conventional starter and prevent the rotation of the ring gear 1, while bolts pass through the through slots 3b.

This type of ring gear 1 suffers from the problem that during molding, sink marks develop which tend to cause deformation of the ring gear 1. This causes the ring gear 1, which should be perfectly circular, to deform into an oval shape.

SUMMARY OF THE INVENTION

It is the object of the present invention to provide a planetary reduction gear having a ring gear made of a molded synthetic resin which does not undergo deformation due to sink marks which develop during molding.

A planetary reduction gear according to the present invention has a ring gear which is made of a molded synthetic resin and which has holes comprising through slots for bolts and non-piercing slots formed in its outer rim at equal intervals around the periphery thereof. By the provision of holes at equal intervals, sink marks which develop during molding of the ring gear act uniformly on the ring gear and deformation of the ring gear at the time of molding can be prevented.

BRIEF DESCRIPTION OF THE DRAWINGS

FIG. 3a is a front view of the ring gear of the starter illustrated in FIG. 2, and FIGS. 3b through 3d are cross-sectional views taken along Lines B—B, C—C, and D—D, respectively of FIG. 3a.

In the figures, the same reference numerals indicate the same or corresponding parts.

DESCRIPTION OF THE PREFERRED EMBODIMENT

Figure 1:
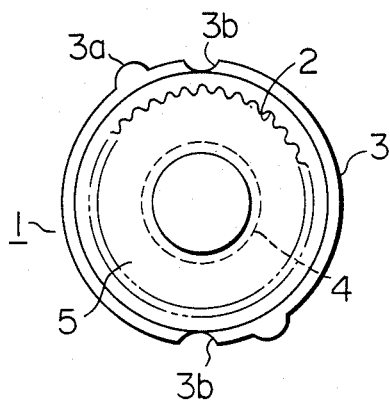
FIG. 1 is a front view of a molded ring gear for a conventional planetary reduction gear.

An embodiment of a planetary reduction gear according to the present invention will now be described while referring to FIGS. 2 and 3. FIG. 2 shows a planetary reduction gear 20 according to the present invention installed in an interval deceleration type-starter 10 for an automobile. The planetary reduction gear 20 is secured to a front frame 40 which is rigidly connected to the yoke 30 of an unillustrated direct current starter motor. The planetary reduction gear 20 comprises a sun gear 21 formed on the end of the output shaft 31 of the motor, a planet gear 22, and a molded ring gear 23 which is secured to the joint portion of the front frame 40 and which is made of a synthetic resin. As does the conventional ring gear 1 illustrated in FIG. 1, the ring gear 23 of the present invention has teeth 24, an outer rim 25, an inner flange 26, and a wall 27 which connects the outer rim 25 with the inner flange 26. The inner flange 26 rotatably supports a rotating output shaft 50 by a sleeve-shaped bearing 61 secured to the inner periphery of the inner flange 26. The rotating output shaft 50 has a flange 51 formed at its end, and a support pin 52 is press fit into a slot 53 in the flange 51. The planet gear 22 is rotatably supported on the support pin 52 by a sleeve-shaped bearing 62 which loosely fits over the support pin 52 and which is press fit into the central hole of the planet gear 22. The end of the output shaft 31 of the motor is journaled in a sleeve-shaped bearing 63 which is press fit into a cylindrical cavity 54 formed in the end of the output shaft 50, and the two output shafts 31 and 50 are separated by a steel ball 64 which is housed within the cavity 54.

Figure 2:
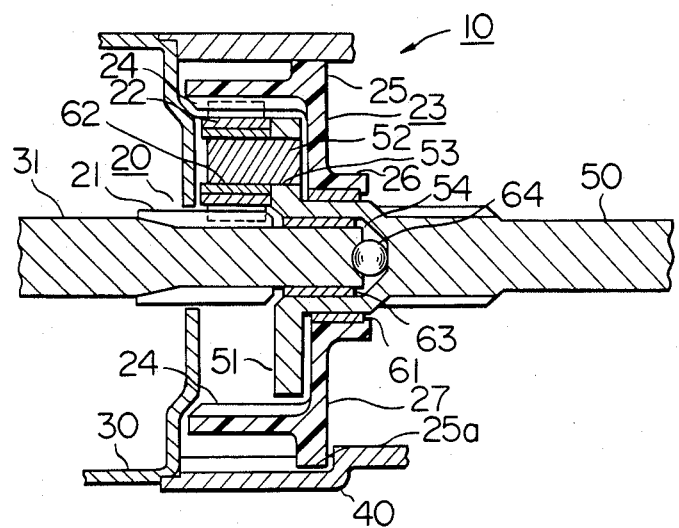
FIG. 2 is a longitudinal cross-sectional view of a portion of an internal deceleration-type starter employing a planetary reduction gear according to the present invention.
Figure 3:
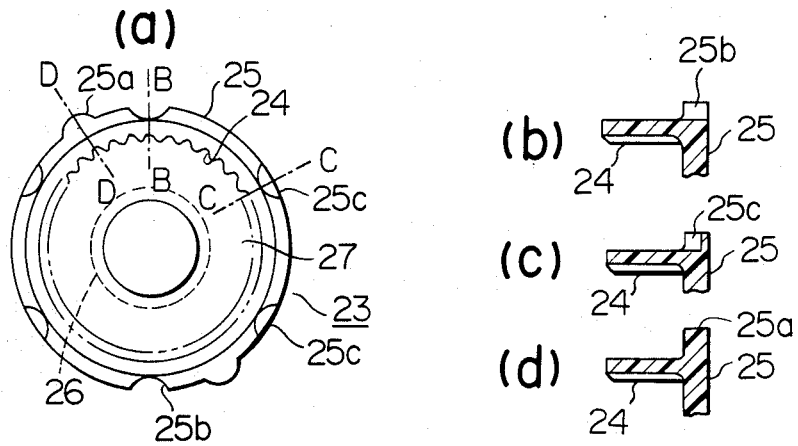

The ring gear 23 of FIG. 2 has a cross-sectional shape which is similar to that of the conventional ring gear 1 of FIG. 1. However, as shown in FIG. 3, in addition to two projections 25a corresponding to the projections 3a and two through seats 25b corresponding to the through slots 3b for bolts of FIG. 1, the ring gear 23 of the present invention has an even number of semicircular non-piercing slots 25c formed in the outer rim 25 which open onto the outer periphery thereof. While the non-piercing seats 25c have the same cross-sectional shape as the through seats 25b, they extend only partially through the thickness of the outer rim 25, as shown in FIG. 3c, which is a cross-sectional view taken along Line C—C of FIG. 3a. The through holes 25b and the non-piercing holes 25c are disposed at equal intervals around the periphery of the rim 25.

The projections 25a are separated from one another by 180 degrees, the through slots 25b are separated from one another by 180 degrees, and the through holes 25b are separated from the projections 25a by a central angle of 30 degrees. In the illustrated embodiment, the ring gear 23 is provided with four non-piercing holes 25c so that each through hole 25b or non-piercing hole 25c is separated from the adjacent hole by a central angle of 60 degrees. However, any even number of non-piercing slots 25c may be employed, and the more that are used the less are the effects of sink marks produced during molding.

The operation of the starter 10 illustrated in FIG. 2 is identical to that of a conventional internal deceleration-type starter. Namely, when the unillustrated direct current motor is energized, the output shaft 31 of the motor is rotated. The rotation of the output shaft 31 is transmitted to output shaft 50 by the planetary reduction gear 20 comprising the sun gear 21, the planet gear 22, and the ring gear 23 while being reduced in speed, and the output shaft 50 cranks an unillustrated engine with which is engages.

Since the ring gear 23 has through holes 25b and non-piercing holes 25c provided over its entire periphery, even if sink marks develop at the time of molding of the ring gear 23, the sink marks will be uniformly distributed around the periphery. Accordingly, deformation of the dimensions of the ring gear 23 can be restrained, and a ring gear 23 having the desired circular form can be obtained. Furthermore, since the non-piercing slots 25c extend only partially through the thickness of the rim 25 of the ring gear 23, dust can not pass through the slots 25c, and therefore the performance of the ring gear 23 is no way degraded with respect to the conventional ring gear 1 illustrated in FIG. 1.

Although the illustrated embodiment of a planetary reduction gear is installed in an automobile starter, it can be employed in any type of apparatus having a planetary reduction gear.

What is claimed is:
1. A planetary reduction gear comprising:
a sun gear;
a planet gear which meshes with said sun gear; and
an internally-toothed ring gear which surrounds said sun gear and said planet gear and meshes with said planet gear, said ring gear being formed of a molded synthetic resin and having a rim forced in its outer periphery and having a plurality of slots formed in said outer rim, said slots comprising through slots for bolts and non-piercing slots which extend only part way through the thickness of said rim, said slots being disposed at equal intervals around the periphery of said rim to cause sink marks developing during molding of the resin to act uniformly on the ring gear so that deformation of the ring gear during molding is prevented.

2. A planetary reduction gear as claimed in claim 1 wherein said through slots and non-piercing slots have a semicircular shape and open onto the outer periphery of said rim.

3. A planetary reduction gear as claimed in claim 1 wherein said ring gear has two through slots displaced by 180 degrees from one another and an even number of said non-piercing slots.

4. A planetary reduction gear as claimed in claim 3 wherein there are four of said non-piercing slots, each of said through slots and non-piercing slots being displaced from the adjacent hole by 60 degrees.

* * * * *

UNITED STATES PATENT AND TRADEMARK OFFICE
CERTIFICATE OF CORRECTION

PATENT NO. : 4,715,243

DATED : December 29, 1987

INVENTOR(S) : Morishita et al

It is certified that error appears in the above-identified patent and that said Letters Patent is hereby corrected as shown below:

Column 4, line 5, change "forced" to --formed--.

Signed and Sealed this

Seventeenth Day of May, 1988

Attest:

DONALD J. QUIGG

*Attesting Officer*       *Commissioner of Patents and Trademarks*